United States Patent [19] [11] 4,092,858
Edgerton [45] June 6, 1978

[54] OCEANOGRAPHIC SENSOR WITH IN-SITU CLEANING AND BIO-FOULING PREVENTION SYSTEM

[75] Inventor: Gene A. Edgerton, Ventura, Calif.

[73] Assignee: The United States of America as represented by the Secretary of the Navy, Washington, D.C.

[21] Appl. No.: 776,578

[22] Filed: Mar. 11, 1977

Related U.S. Application Data

[63] Continuation-in-part of Ser. No. 635,552, Nov. 26, 1975, abandoned.

[51] Int. Cl.² .................................................. G01R 3/00
[52] U.S. Cl. .................................................. 73/170 A
[58] Field of Search ....................... 73/170 A; 340/10; 134/1

[56] References Cited

U.S. PATENT DOCUMENTS

| 3,509,522 | 4/1970 | Whitfill | 340/10 |
| 3,559,162 | 1/1971 | Granfors et al. | 340/10 |
| 3,564,491 | 2/1971 | Granfors et al. | 340/10 |
| 3,821,894 | 7/1974 | Roeben et al. | 73/170 A |
| 3,928,063 | 12/1975 | King et al. | 134/1 |

Primary Examiner—Anthony V. Ciarlante
Attorney, Agent, or Firm—Richard S. Sciascia; Joseph M. St. Amand

[57] ABSTRACT

An oceanographic sensor which allows in-situ bio-fouling prevention and/or cleaning of foreign matter from its surface while simultaneously operating in a sensor mode. The sensor mode is fabricated from crystal substance and utilizes the piezoelectric electric effect. Sensing elements are fabricated on either the outside or inside, or both sides, of the core depending upon what measurements need to be taken. When the sensor is submerged and excited by an electrical potential, at or near resonance, the sensor core will vibrate and remove all foreign matter from its surface. The cleaning and bio-fouling prevention is done concurrently with oceanographic parameter measurements made by the sensor. Also, it should be noted that when the transducer is vibrated at or near its resonant frequency at a level below the cavitation threshold, the transducer and sensor system deters all bio-fouling from adhering to the sensor surface. Therefore, the oceanographic sensor device of this invention allows both in-situ cleaning of contaminants and a bio-fouling prevention system for use with submerged transducers.

17 Claims, 2 Drawing Figures

OCEANOGRAPHIC SENSOR WITH IN-SITU CLEANING AND BIO-FOULING PREVENTION SYSTEM

This is a continuation-in-part of U.S. patent application Ser. No. 635,552 filed Nov. 26, 1975 now abandoned, for OCEANOGRAPHIC SENSOR WITH IN-SITU CLEANING SYSTEM.

The present invention can be used with the device of U.S. Pat. No. 3,995,480 issued Dec. 7, 1976 for THERMAL SENSOR FOR MEASUREMENT OF OCEAN CURRENT DIRECTION.

BACKGROUND OF THE INVENTION

The present invention relates to oceanographic solid-state sensors and detectors, and more particularly to a sensor system having means for self-cleaning the surface of foreign matter and also for bio-fouling prevention of the surface by use of acoustic energy.

Until now, certain oceanographic measurements have been hindered due to the problem of marine organisms in ocean water attaching to the surface of submerged solid-state measuring devices. Frequently, it is desired to have oceanographic sensors remain submerged in the ocean for 6 months or longer. It is not practical to frequently remove a sensor or detection device from the water for cleaning purposes. The only methods available in the past to prevent fouling of the sensor devices employed the use of toxic materials which were adhered as a coating on the surface of the sensor. The anti-fouling coating afforded some protection for a limited period of time, but also reduced the sensitivity of the sensor and its general utility.

Oceanographic sensors in general have a limited in-situ life due to the major problems of bio-fouling and contamination (bio-fouling being defined as organic growth on the sensor's surface while submerged in the ocean). To alleviate this problem, the present invention provides a system for in-situ cleaning of the bio-fouling/contamination and also for bio-fouling prevention. It entails the use of sonic energy which varies in frequency from approximately 10 KhZ to frequencies which approach the resonant frequency of the organic matter. It also varies in energy intensity levels, from levels which create acoustic streaming forces to intensities which cause cavitation. Acoustic streaming forces are those forces, caused by movement of water adjacent to the transducer or surface to which the transducer is attached, which are generated by the motion of the sensor transducer prior to cavitation. Cavitation forces are those forces which are created as the pressure at the surface of the sensor is reduced to a point where the water is boiled and creates cavitation bubbles.

The present invention is an oceanographic sensor, cleaning transducer and bio-fouling prevention system. The sensor elements are fabricated on a transducer (e.g., piezoelectric or magnetostrictive) substrate which allows in-situ cleaning and fouling prevention of marine organisms and other foreign matter from its surface and thereby prevents reduction of sensitivity of the sensor. The sensor core is fabricated from a crystal substance and the sensing element is usually fabricated on a surface of the core. When excited electrically, at or near resonance, the sensor core vibrates such that all fouling matter is removed from the surface of the sensor and also such excitation prevents any growth to occur. It is particularly important that the sensor can be cleaned while submerged in the ocean, and the cleaning in no way reduces the sensor sensitivity or interferes with measurements made simultaneously while cleaing. Also, the cleaning process does not deteriorate with time as do toxic antifouling coatings. When the sensor is excited continuously below cavitation threshold, the sensor system deters all bio-fouling from the sensor surface. The cleaning of the sensor surface and the bio-fouling prevention of the sensor surface is done with the same circuitry. The difference being that the cleaning is performed by use of greater energy intensity levels than are required for the bio-fouling prevention (antifouling). The antifouling system can work on a number of different frequencies and the system can utilize any frequency required.

DETAILED DESCRIPTION OF THE DRAWINGS

DESCRIPTION OF THE PREFERRED EMBODIMENTS

Figure 1:
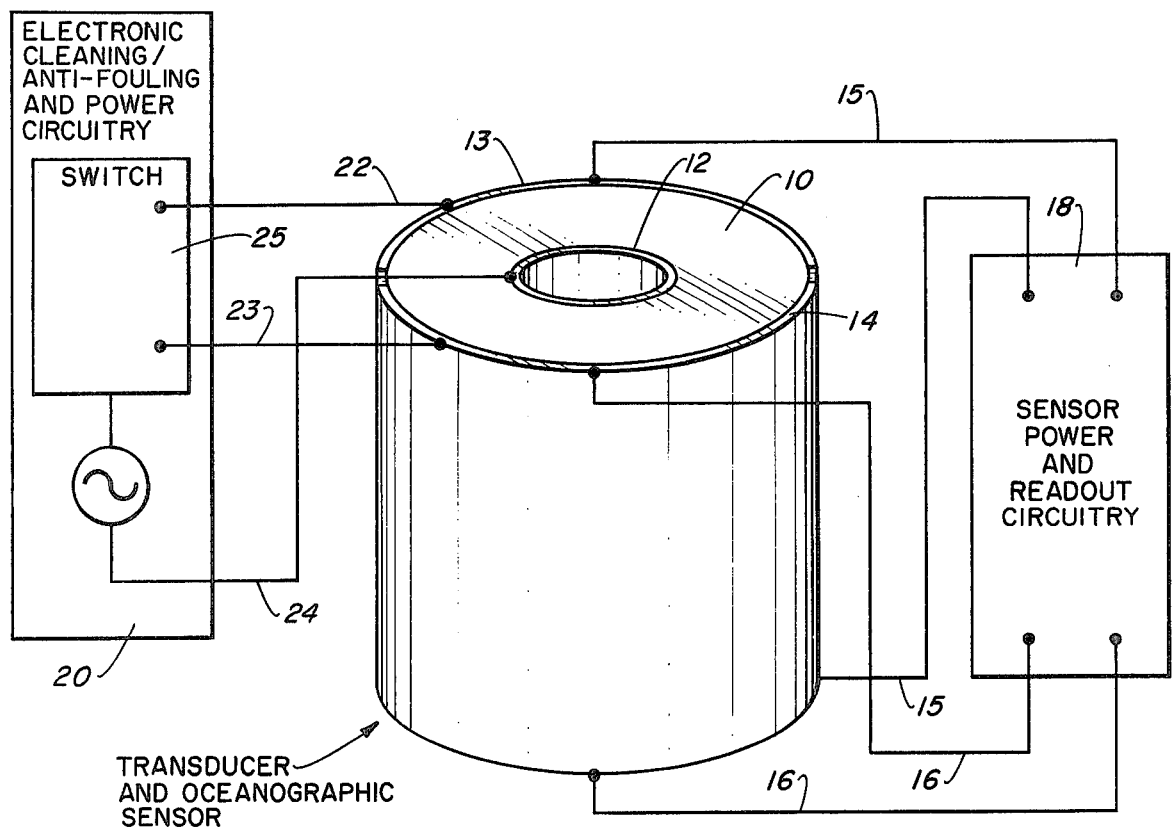
FIG. 1 is a diagrammatic sketch of the sensor system showing circuit lines for antifouling and cleaning, and for sensor power and readout.
Figure 2:
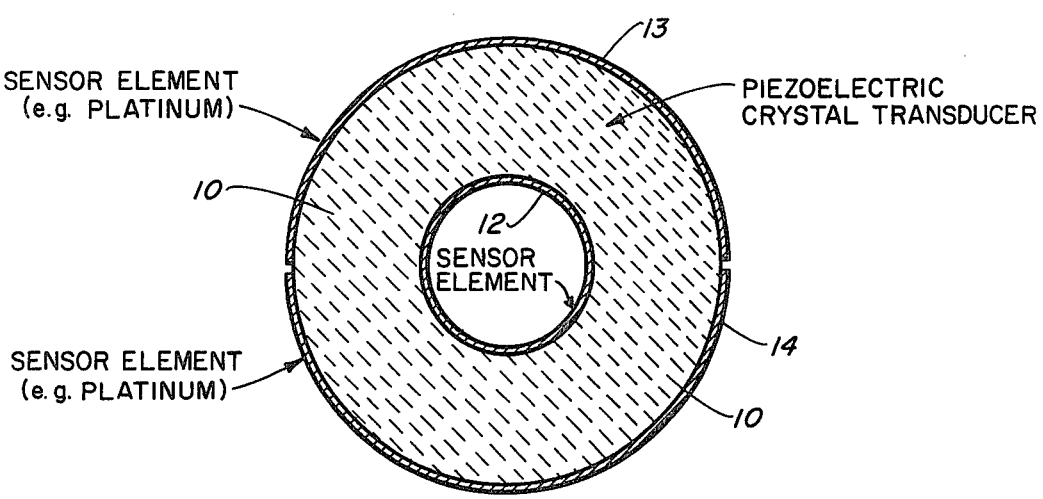
FIG. 2 shows a cross-sectional view of one embodiment for a sensor of the present invention.

The device of the present invention uses an active fouling cleaning and prevention mechanism applying the piezoelectric or magnetostrictive effect as opposed to a passive one that uses a coating of toxic material. Construction of the device is illustrated in FIGS. 1 and 2. Sensor core (e.g., transducer) 10, as shown, is in the configuration of a hollow cylinder of natural crystal or synthetic crystal substances, but can be made in any desired shape such as spherical, cubical, rectangular, etc., to suit particular needs. Sensing elements 12, 13, 14, etc., can be fabricated from platinum, gold or detector materials such as piezo-resistance material or other semiconductor materials, etc., that can be deposited on or attached to the inner and outer surfaces of the transducer or sensing core 10, depending upon the desired measurements to be taken. A protective water-proof coating can be provided over the transducer and sensor elements. Electrical leads 15 and 16 connect sensing elements 13 and 14 to sensor power and readout circuitry 18. The power source can be any suitable well known A.C. power supply or battery pack with solid-state oscillator circuitry, etc.

The electrical core 10 is connected to electronic antifouling/cleaning and power circuitry 20 for excitation by means of electrical lines 22, 23 and 24 connected to conductive sensor coatings 12, 13 and 14, respectively. The fouling cleaning/prevention operation depends upon the fact that when a potential is applied to a crystal substance, such as barium tetranate, natural quartz crystal, synthetic quartz crystal, ferro-electric crystal substances, etc., the crystal undergoes a mechanical deformation or stress along specific planes. When the sensor 10 is submerged in the ocean and excited by an electrical potential, at or near resonance, from power source 20, the sensor core vibrates and removes the foreign matter from the surface of the core and sensing elements or prevents initial growth thereon. In other words, the transducer is vibrated at or near resonance to clean itself and any measurement sensors fabricated thereon as an integral part of the system simultaneously while oceanographic measurements are being taken. Ultra-sonic vibration loosens the foreign matter. Also, if the transducer is continuously excited to vibrate at or below cavitation, it will deter all marine growths and contaminants from the sensor and transducer surface and will prevent bio-fouling from occurring initially. However, if the system is shut off for a while, the device can readily be cleaned from later accumlated fouling matter by initiating the cleaning cycle when the system is again reactivated. The system for cleaning or antifouling can be operated automatically on intermittent cycles, if desired, using simple clock switching mechanisms and the like.

For example, during the cleaning or bio-fouling prevention cycle, the separate outer conductive coatings (13 and 14 in the embodiment illustrated) are connected by lines 22 and 23 in common via switch 25 to one side of the alternating power source in electronic cleaning power circuitry 20. The opposite or inside coating (i.e., 12) is connected by line 22 to the other side of the alternating power source in circuitry 20. Only two outer and one inner conductive coatings are shown in the drawings; however, any desired number can be used. When cleaning power is switched on, the potential across the inner and outer surfaces of the hollow cylinder will cause the transducer to vibrate at or near resonance, as aforementioned, to clean the sensor of all foreign matter and prevent any bio-fouling to occur. The cleaning can be accomplished with the energy level near the cavitation threshold while the bio-fouling prevention can take place at lower energy intensities. Both of these operations can be accomplished while oceanographic measurements are being taken and recorded from the readout circuitry. The frequency can be varied as needed for removal of different organisms or contaminants, or as best suited to prevent bio-fouling. If the system is to be used as a measurement sensor only, switch 25 can be used to disconnect lines 22 and 23 from each other and from the alternating power in circuitry 20 and each of the conducting or outer sensor halves (e.g., platinum sensor elements) 13 and 14 can be used as a heater element using a constant electrical current from sensor power and readout ciruitry 18 applied across opposite ends of each separate coating, as shown in FIG. 1, to heat each coating. If required, this can be accomplished while cleaning/prevention is taking place. As the speed of ocean water flowing over the submerged transducer changes, for example, the temperature of the outer platinum films 13 and 14 will change due to change in heat transfer (i.e., change in resistance, thus changing the voltage since the electrical current remains constant). This change in temperature is measured in circuitry 18 by the change in voltage across each coating 13 and 14.

Also, the direction of ocean current flow can be determined by the difference in temperature detected in each of the two (or more) coatings on the outer surface of core 10, and as more fully described in copending U.S. patent application Ser. No. 603,219 aforementioned.

The system can be operated occasionally such as once a week, month, or year, etc., to clean off bio-fouling materials or can be operated on a regular intermittent basis every few minutes, days, etc., or on a fairly continuous basis to prevent any fouling or contamination whatsoever from building up. A combination of the above may be desirable for some circumstances. Nearly all oceanographic measurements today use computer data handling and analysis equipment as a practical matter to accomplish a greater number of measurements. The present system permits more reliable measurements to be made with sensor equipment by elimination of marine fouling and other contaminants.

Simultaneous measuring and cleaning or prevention of bio-fouling is accomplished with this system without interference between the different modes of operation of the system because of the relatively high frequencies involved. Acoustic streaming starts at low energy levels and increases in force until the point where cavitation occurs. The movement of the water adjacent the transducer or surface to which the transducer is attached due to the vibration of the transducer creates acoustic streaming forces which prevent fouling of the surface of the device. At the point of cavitation, contaminants already on the surface are dislodged and cleaned from the device. oceanographic measuring equipment of the type disclosed can be attached to the bottom of ships' hulls. Also, transducer units can be affixed to ships' hulls, and the hulls can be cleaned and maintained clean by cavitation of the hull to clean it from fouling contaminants and then intermittent or continuous acoustic streaming to reduce or prevent build-up of fouling contaminants over a long period of time.

Transducers very sensitive to temperature can be used without any additional sensor coatings for temperature measurement purposes and kept free from fouling and contaminants by the present system.

The cleaning/bio-fouling prevention system has other practical applications with various other types of oceanographic equipment and marine devices. The system can be used with any undersea device that can be driven or vibrated from a piezoelecctric transducer in-situ continuously or intermittently to cause acoustic streaming and/or cavitation forces, as already described. Sonar transducers, for example, can be kept free from fouling marine organisms or cleaned using this system.

The foregoing described systemcan be used with undersea parameters measurement equipment used to measure and obtain geographical, geological, physical, biological and marine meteorological data in oceans, lakes and rivers, and at various depths including deep ocean areas. This system allows sensor equipment to remain submerged for exceptionally long period of time without being hindered by bio-fouling and other contaminants.

Obviously many modifications and variations of the present invention are possible in light of the above teachings. It is therefore to be understood that within the scope of the appended claims the invention may be practiced otherwise than as specifically described.

What is claimed is:

1. An oceanographic sensor system having the capability of both self-cleaning and bio-fouling prevention simultaneously while operating in a sensor mode while submerged, for removal of foreign materials thereon and the prevention of fouling thereof, comprising:
   a. a transducer substrate element of suitable crystal substance and shape operable to be vibrated at or near a resonant frequency at various energy levels;
   b. a plurality of separate sensor means fabricated on surfaces of said transducer substrate element as an integral part thereof;
   c. at least two of said sensor means being on opposite sides of said transducer element;
   d. said sensor means being electrically connected to sensor readout means;
   e. an electrical means for providing an alternating electrical potential to vibrate said transducer element while said sensor means is operating in a sensor mode; means for connecting any of the sensor means on one side of the transducer element to one side of said electrical means and any of the conductive coatings on the opposite side of said transducer element to the opposite side of said power source for exciting the transducer substrate element to cause vibration thereof at desired frequencies to generate sonic energy which varies in energy intensity from levels which create acoustic streaming forces to intensities which cause cavitation forces to cause removal of any foreign fouling matter on the transducer element and integral sensor means by cavitation of the surrounding water and to prevent fouling due to marine organisms adhering to the sensor surface by acoustic streaming of water adjacent the surface thereof concurrently while oceanographic parameter measurements are being made by said sensor means.

2. A device as in claim 1 wherein said transducer substrate element is a piezoelectric transducer.

3. A device as in claim 1 wherein said transducer substrate element is a magnetostrictive transducer.

4. A device as in claim 1 wherein said transducer is in the shape of a hollow cylinder having sensor means on the inner and outer surfaces thereof.

5. A device as in claim 4 wherein sensor power and readout circuit means are connected across opposite ends of each of said separate sensor means fabricated on exterior surfaces of said transducer substrate element for measuring ocean current and other oceanographic phenomenon.

6. A device as in claim 4 wherein:
   a. the interior surface of said hollow cylinder transducer has a single sensor means thereon and the exterior surface has a plurality of separate sensor means positioned about the exterior surface thereof;
   b. vibration circuitry, sensor, power and readout circuitry being connected across opposite ends of each of the plurality of separate sensors means positioned about the exterior said surface for simultaneously cleaning, fouling prevention and measuring ocean current pehnomenon.

7. A device as in claim 1 wherein said transducer is made of natural quartz crystal.

8. A device as in claim 1 wherein said transducer is made of synthetic quartz crystal.

9. A device as in claim 1 wherein said transducer is made of barium titanate.

10. A device as in claim 1 wherein said transducer is made of ferroelectric crystal substances.

11. A device as in claim 1 wherein said sensor power and readout circuitry is connected across opposite ends of each of said plurality of sensor means for measuring various ocean characteristics.

12. A device as in claim 1 wherein said separate sensor means are non-corrosive metal films formed on the crystal substrate.

13. A drive as in claim 1 wherein said sensor means are semiconductor coatings.

14. A device as in claim 1 wherein said transducer is operable to be vibrated for cleaning and fouling prevention simultaneously while operating said sensor means for making oceanographic measurements.

15. A device as in claim 1 wherein said means for connecting the sensor means to said electrical means includes switching means which also operates to switch said transducer to electrical heating means.

16. A device as in claim 1 wherein said electrical means includes means for vibrating said transducer at various frequencies which vary from approximately 10 Khz to its resonant frequency at or below the cavitation threshold.

17. A method for self-cleaning oceanographic solid-state sensors in-situ for removal of fouling marine organisms and prevention of fouling thereof while submerged in a body of water and simultaneously operating in a sensing mode, comprising:
   a. mounting sensing elements on surfaces of a trasducer substrate such that at least two of the sensing elements are mounted on opposite sides of the transducer substrate and are connected to sensor readout circuitry;
   b. while operating in a sensing mode, electrically connecting said at least two sensing elements via switching means to an electrical source for electrically exciting said substrate to vibrate ultrasonically in water to generate sonic energy which varies in energy intensity from levels which create acoustic streaming forces to intensities which cause cavitation forces and thereby loosen and remove foreign and marine matter from the surface of the transducer substrate and the elements mounted thereon and prevent fouling marine organisms from adhering thereon by acoustic streaming of water adjacent the substrate surface.

* * * * *